United States Patent [19]

Georgopulos et al.

[11] Patent Number: 4,488,772

[45] Date of Patent: Dec. 18, 1984

[54] ELECTRO-OPTIC INDICATING DEVICE

[75] Inventors: Thomas Georgopulos, Clearwater, Fla.; Thomas A. Cioper, Rolling Meadows, Ill.

[73] Assignee: GTE Automatic Electric Inc., Northlake, Ill.

[21] Appl. No.: 414,199

[22] Filed: Sep. 2, 1982

[51] Int. Cl.³ .......................... G02F 1/13; H04M 1/26
[52] U.S. Cl. .................................. 350/331 R; 350/338; 179/90 L
[58] Field of Search ............... 40/491, 490, 448, 585, 40/16; 350/338, 331 R, 333, 334; 179/81 C, 84 L, 90 L

[56] References Cited

U.S. PATENT DOCUMENTS

| | | | |
|---|---|---|---|
| 3,727,527 | 4/1973 | Borowski et al. | 330/331 R |
| 3,835,463 | 9/1974 | Tsukamoto et al. | 350/333 |
| 4,145,120 | 5/1979 | Kubota | 350/334 X |
| 4,262,436 | 4/1981 | Clement | 40/490 X |
| 4,345,396 | 8/1982 | Janssen | 40/490 |

*Primary Examiner*—John K. Corbin
*Assistant Examiner*—David Lewis
*Attorney, Agent, or Firm*—Anthony Miologos; Robert J. Black

[57] ABSTRACT

A display apparatus including a liquid crystal device is disposed to turn on or off in the presence or absence of a control voltage respectively. Information located under the liquid crystal device and normally occulted, becomes visible when the display turns on.

4 Claims, 2 Drawing Figures

ELECTRO-OPTIC INDICATING DEVICE

FIELD OF THE INVENTION

The present invention relates in general to electro-optic display devices and more particularly to a device employing a liquid crystal display to provide line status information in a multi-station telephone system.

BACKGROUND OF THE INVENTION

Multi-line, multi-station telephone systems actively communicate over a large number of telephone lines, and it is important that each station have some idea as to which lines the other stations are actively talking on. Further, a master station or attendants console may be required to supervise or direct communications between the stations and therefore an easily discernable display must be provided for indicating the active lines.

Many multi-station telephone systems are provided with tungsten lamps or neon lamps as visual indicating elements, to indicate the status of each line available to each station. Tungsten lamps have the defect of short life, while neon lamps have the defect of generally requiring a high voltage power supply (more than 100 volts for example). Electro-optic or liquid crystal displays on the other hand offer extreme compactness minimal control power and contrast independent of the ambient light level.

SUMMARY OF THE INVENTION

The device in accordance with the present invention is an electro-optic indicating device for providing information to a viewer in response to a control voltage. A liquid crystal display, having a layer of liquid crystal material is contained between a first and a second transparent slide. Each slide includes an electrode arranged to have a control voltage applied thereat. An information holder including an information strip is attached to the underside of the liquid crystal cell and sandwiched between a circuit board. The circuit board includes terminals arranged to accept the liquid crystal cell electrodes connecting the liquid crystal cell to a source of control voltage.

With no control voltage applied to the liquid crystal cell ambient light striking the cell is scattered by the liquid crystal material rendering the information strip not visible through the display. When a control voltage is applied to the electrodes the molecular structure of the liquid crystal material realigns parallel to the applied field thereby rendering the cell transparent. In this on-state the information strip is visible through the cell and displayed to the viewer.

The same principle may be applied to a multiple line status indicating device employing a plurality of individual liquid crystal cells. Each cell is formed by an intersecting column and row electrode and is addressed in a matrix form. When a control voltage is applied to an individual column and row electrode, an associated liquid crystal cell becomes transparent opening the window to the information underneath and displaying the information to the viewer.

BRIEF DESCRIPTION OF THE DRAWING

A better understanding of the invention can be had from the consideration of the following detailed description taken in conjunction with the accompanying drawings in which.

DESCRIPTION OF THE PREFERRED EMBODIMENT

Figure 1:
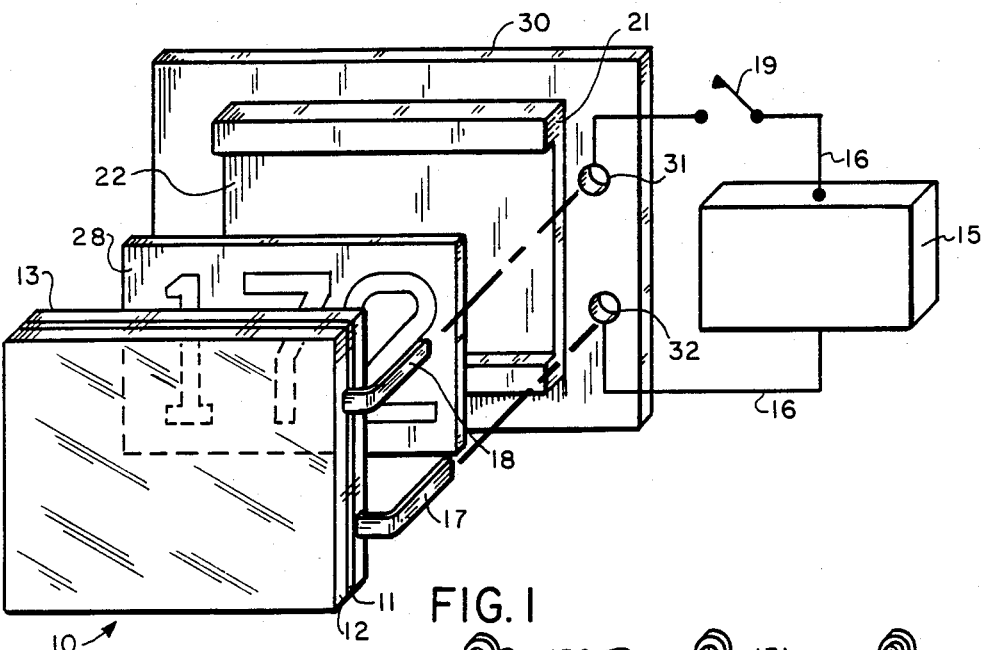
FIG. 1 shows the electro-optic indicating device in accordance with the present invention.

Turning now to FIG. 1 the electro-optic indicating device of the present invention includes a liquid crystal display 10 comprising a layer of liquid crystal material 11 sandwiched between two transparent glass slides 12 and 13. Each slide includes on its inner surface spaced electrodes arranged to form a plurality of intersections across the liquid crystal layer. A voltage generator 15 supplies a control voltage to the electrodes to change the liquid crystal to its on-state and maintains a sustaining voltage across layer 11. Leads 16 apply the voltage to electrode 17 and 18 via switch 19.

The liquid crystal layer 11 is a positive nematic with between 1% and 99% of a cholesteric material. Such a material mixture, when formed as a thin layer e.g. 12 $\mu$m thick, scatters light in its off-state with no electric field applied across layer 11. Application of a control voltage, typically 30 volts r.m.s. for a 12 $\mu$m thick layer containing about 10% of cholesteric by weight, causes a realignment of liquid crystal molecules parallel to the applied field, i.e. its on-state. In the on-state liquid crystal layer 11 is transparent. The time taken to turn from off to an on depends on the amount of cholesteric material present, the thickness of the layer and the applied voltage level.

The electro-optic indicating device is completed by an information holder 20 having a rear surface 21 mounted to a printed circuit board 30. A recessed area 22 is arranged to accept an information insert 28 which has the information to be conveyed to a viewer presented thereon. The liquid crystal display 10 is mounted onto surfaces 23 of holder 20, sandwiching insert 28 between holder 20 and display 10. Liquid crystal display leads 17 and 18 are terminated to terminals 31 and 32, respectively, connecting the liquid crystal display 10 to voltage generator 15.

With switch 19 open the liquid crystal display 10 assumes the off-state and light striking the liquid crystal display face is reflected and scattered rendering the display opaque and the information insert 20 not visible. With switch 19 closed a control voltage is applied to display 10 via electrodes 17 and 18 and the display "turns-on" rendering the display transparent thereby presenting the information on insert 28 to the viewer. The information will be visible to the viewer as long as the control voltage is kept at the voltage threshold required to maintain the liquid crystal molecules parallel to the applied field. Opening switch 19 turns the display off rendering display 10 opaque and the information on insert 28 not visible to the viewer.

The arrangement of presenting information shown in FIG. 1, may be used to advantage in a multi-station telephone system or in any information display requiring a visual indicator of an "off-on" or "busy-free" status.

In such an application the liquid crystal display is divided into individual cells. Each cell is addressed in matrix form and associated with a particular operation, line, function, etc. By turning on or off the appropriate cell information effecting the status of a system can be conveyed efficiently to a viewer or user.

Figure 2:
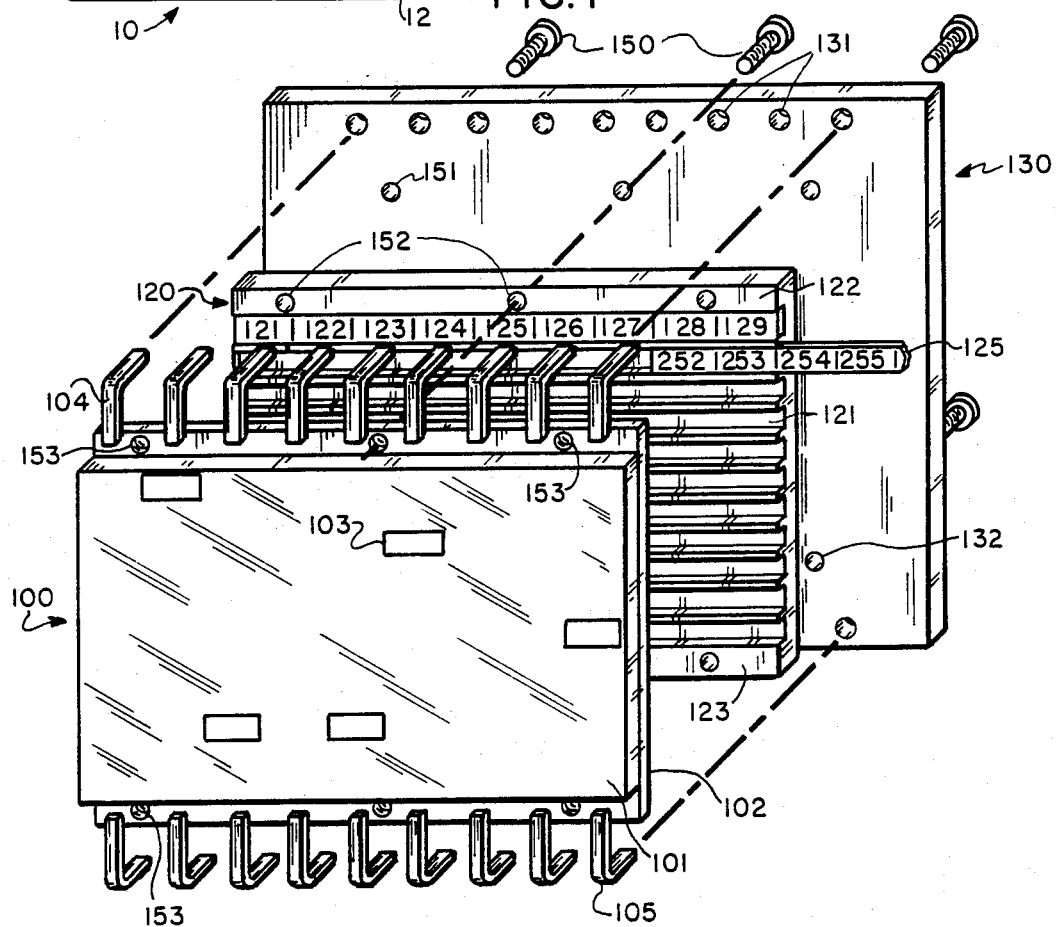
FIG. 2 is an electro-optic indicating device including a liquid crystal display divided into a plurality of cells disposed to indicate multiple information.

Turning now to FIG. 2, an electro-optic display apparatus for a multi-station telephone system is shown. The apparatus is characterized by a liquid crystal display module 100, an information holder 120, and a circuit board 130. Display 100 includes a liquid crystal display face 101 and a rear panel 102. Panel 102 distributes the operating voltage via a matrix of electrodes leading to individual cells such as those shown as 103 from column and row leads 104 and 105, respectively.

Holder 120 includes a plurality of information insert slots 121 comprised of a planar surface between a pair of raised walls. Upper and lower raised surfaces 122 and 123 of holder 120 are disposed to have liquid crystal display module 100 attached thereat. Each information insert slot 121 is arranged to hold an information strip 125 which has information to be displayed, typed, handwritten or printed on its face. As can be readily seen the right side of holder 120 is arranged to remain open allowing information inserts 125 to be slid in place when the display apparatus is completely assembled.

The apparatus is completed by a circuit board 130 which includes a plurality of terminals comprised of plated through holes 131 and 132 disposed to accept and fixedly retain column and row leads 104 and 105, respectively. Holes 131 and 132 are normally connected to a telephone system (not shown) which provides the proper control voltage for operation of the liquid crystal display 100. Module 100, holder 120 and circuit board 130 are secured together using threaded fasteners 150. Each fastener 150 is disposed to enter bore 151 on the circuit board, a bore 152 on holder 120 and engage a threaded bore 153 on the liquid crystal display module 100. The assembled apparatus is then arranged to mount on a telephone station or on an attendants console.

With renewed reference to FIG. 2, the operation of the display apparatus will be described. When all lines are free for use, no control voltage is applied from the telephone system to leads 104 and 105 via circuit board 130. In this condition each cell 103 of liquid crystal display 100 is completely opaque, indicating to the operator that all lines are available. It should be noted that inserts 125 would be used to list the various stations or lines available for use within the multi-station telephone system and each line would be associated with an individual cell 103. Whenever a line goes busy within the multi-station telephone system the respective column and row leads 104 and 105 would have a control voltage applied to it, rendering its associated cell 103 transparent. This has the effect of opening a clear window to the line number underneath, thereby providing a visual indicator that the line is busy. When the line is released the control voltage is removed and that particular cell 103 again becomes opaque. The matrix arrangement of the electrodes can allow any number of cells to be transparent at any time.

It will be understood as well as appreciated by those skilled in the art that other information may be conveyed to a viewer using the teachings of the present invention. For example, trunk status, line groups, instrument functions, as well as user prompts could all be presented to a viewer. Additionally, the flexibility of operation of a liquid crystal display can allow an inverse configuration where each cell is opaque when the control voltage is applied, with each cell becoming transparent when the control voltage is removed.

Although the best mode contemplated for carrying out the present invention has been herein shown and described it will be apparent that modifications and variations may be made without departing from what is regarded as the subject matter of the invention.

What is claimed is:

1. An electro-optic indicating device for use in a multi-line telephone instrument for displaying line status information responsive to a control voltage applied to the indicating device when one or more lines are in use; said electro-optic indicating device comprising:
    a liquid crystal display including a layer of liquid crystal material contained between first and second transparent slides, said first slide including a first electrode and said second slide including a second electrode, said first and second electrodes arranged to receive said control voltage;
    information display means located under said liquid crystal display comprising an information holder having a plurality of walls extending from a face thereof, said walls forming a plurality of information receiving areas arranged to receive a plurality of information strips having information to be displayed printed thereon, said information display means normally occulted; and
    switching means for applying said control voltage to said first and second electrodes changing the optical property of said liquid crystal material rendering said information display visible.

2. The electro-optic indicating device as claimed in claim 1, wherein: said information display means includes an information holder having a plurality of walls extending from a face thereof, said walls forming a plurality of information receiving areas arranged to receive a plurality of information strips therein.

3. The electro-optic indicating device as claimed in claim 1, wherein: each of said plurality of information strips is composed of an opaque material.

4. An electro-optic indicating device as claimed in claim 1, wherein there is further included a circuit board including a first set of terminals and a second set of terminals, and said information holder is disposed to mount on said circuit board with an individual one of said first set of electrodes and said second set of electrodes communicating with a different one of said circuit board first set and second set of terminals respectively, connecting said liquid crystal display to said control voltage.

* * * * *